US007223019B2

United States Patent
Hoppe

(10) Patent No.: US 7,223,019 B2
(45) Date of Patent: May 29, 2007

(54) SWIVEL SLIDE BEARING

(75) Inventor: Stefan Hoppe, Sulz am Neckar (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 165 days.

(21) Appl. No.: 10/504,727

(22) PCT Filed: Jan. 23, 2003

(86) PCT No.: PCT/EP03/00681

§ 371 (c)(1),
(2), (4) Date: Feb. 3, 2005

(87) PCT Pub. No.: WO03/069174

PCT Pub. Date: Aug. 21, 2003

(65) Prior Publication Data

US 2005/0123225 A1 Jun. 9, 2005

(30) Foreign Application Priority Data

Feb. 15, 2002 (DE) ................................ 102 06 381
May 8, 2002 (DE) ................................ 102 20 610

(51) Int. Cl.
F16C 23/00 (2006.01)
(52) U.S. Cl. ..................... 384/192; 384/206; 384/906
(58) Field of Classification Search ................ 384/192, 384/206–214, 906; 92/12.2
See application file for complete search history.

(56) References Cited

U.S. PATENT DOCUMENTS

| 2,309,281 | A |   | 1/1943  | Steele            |         |
|-----------|---|---|---------|-------------------|---------|
| 2,423,684 | A |   | 7/1947  | Collito, Jr.      |         |
| 2,825,608 | A |   | 3/1958  | Abel              |         |
| 3,160,449 | A | * | 12/1964 | Scott             | 384/208 |
| 3,395,951 | A |   | 8/1968  | Barr et al.       |         |
| 3,746,410 | A |   | 7/1973  | Cameron           |         |
| 3,765,733 | A |   | 10/1973 | Hackman           |         |
| 3,794,392 | A |   | 2/1974  | Scott             |         |
| 4,309,062 | A |   | 1/1982  | Bishoff           |         |
| 4,765,757 | A |   | 8/1988  | Hartl             |         |
| 5,265,965 | A |   | 11/1993 | Harris et al.     |         |
| 5,660,482 | A |   | 8/1997  | Newley et al.     |         |
| 5,716,143 | A | * | 2/1998  | Browne et al.     | 384/192 |
| 5,762,424 | A |   | 6/1998  | Harris et al.     |         |
| 6,017,184 | A |   | 1/2000  | Aguilar           |         |
| 6,149,310 | A |   | 11/2000 | Ono et al.        |         |

(Continued)

FOREIGN PATENT DOCUMENTS

DE    1 876 305    7/1963

(Continued)

Primary Examiner—Thomas R. Hannon
(74) Attorney, Agent, or Firm—Scully, Scott, Murphy & Presser, P.C.

(57) ABSTRACT

The invention relates to a swivel slide bearing comprising an inner first bearing part (31) with an outer first bearing surface (31a) and comprising an outer second bearing part (32) with an inner second bearing surface (32a). The outer bearing part (32) surrounds the inner bearing part (31), and the outer periphery of the outer bearing part (32) is provided in the form of a ring having a spherical segment-shaped third bearing surface (32b), via which it is mounted, whereby being able to move in a manner similar to a ball but in a limited manner, inside a third bearing part (33) having a spherical segment-shaped inner fourth bearing surface (33a) that encircles the third bearing surface (32b). In order to ensure an easy mounting, at least one insertion slot (36) is provided on one side of the third bearing part (33), and the second bearing part (32) until it reaches a position in which the center of curvatures (M) of the third and fourth bearing surface (32b, 33a) overlap.

30 Claims, 4 Drawing Sheets

FOREIGN PATENT DOCUMENTS

Figure 4:
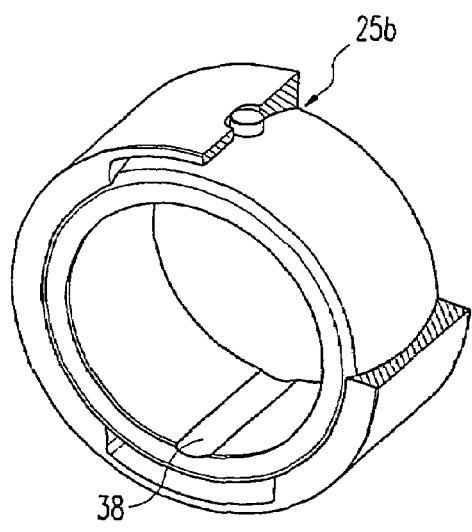

| | | |
|---|---|---|
| DE | 3328509 C1 | 4/1985 |
| DE | 28 52 690 C2 | 2/1989 |
| DE | G 91 03 425.6 | 8/1991 |
| DE | 43 36 915 A1 | 5/1995 |
| GB | 779191 | 7/1957 |

* cited by examiner

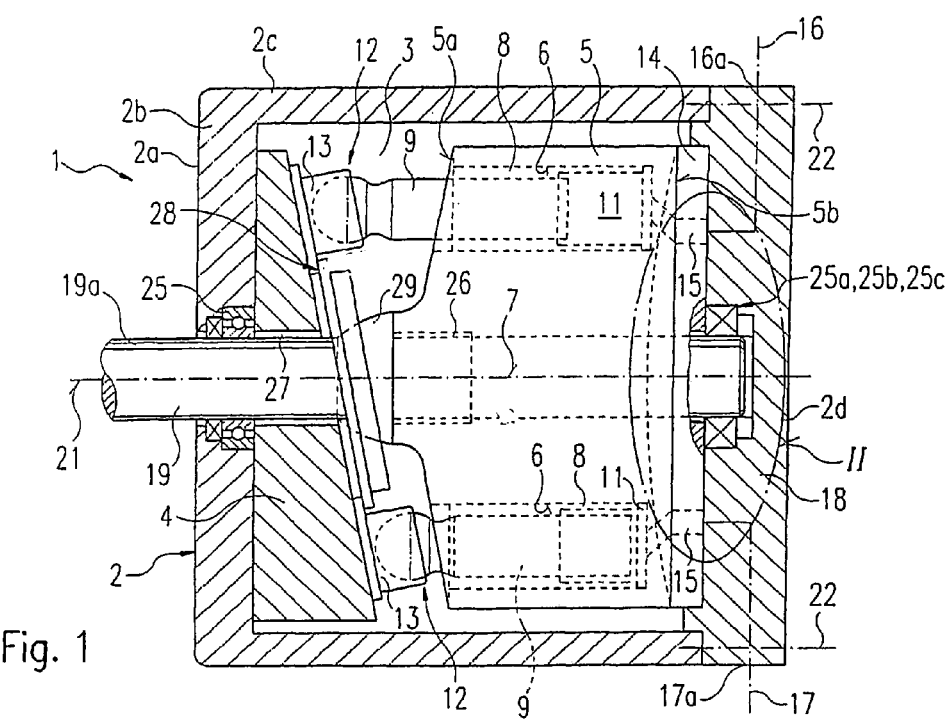
Fig. 1
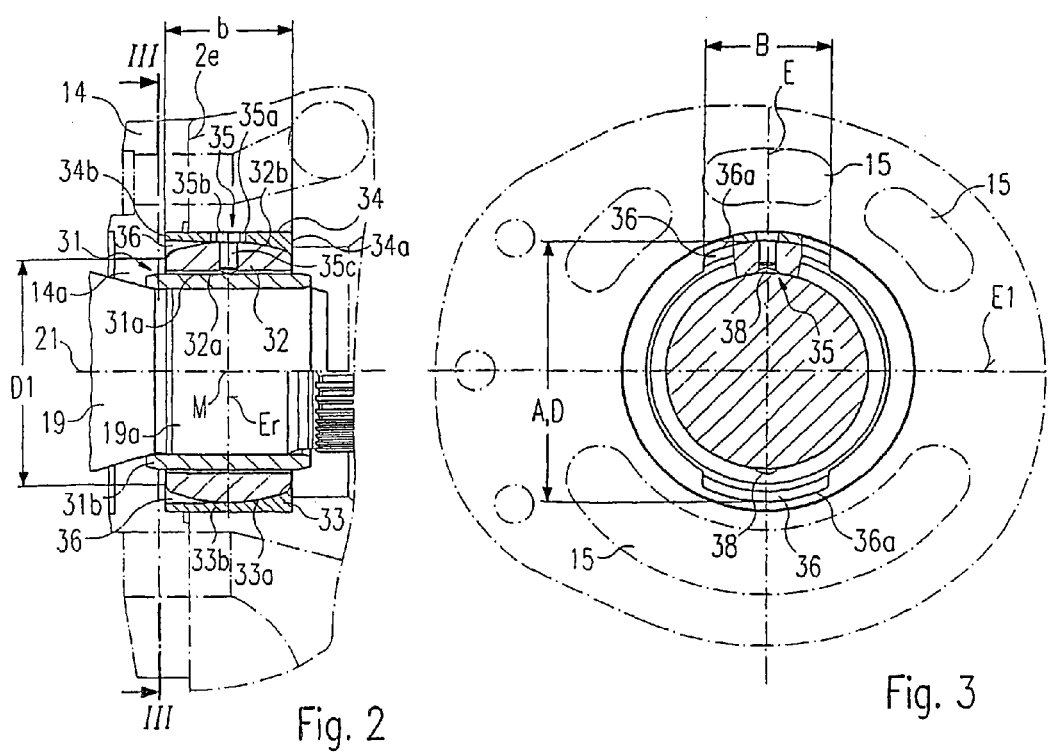
Fig. 2
Fig. 3

SWIVEL SLIDE BEARING

The invention relates to a swivel slide bearing according to the preamble to claim 1.

With the slide bearing mounting of shafts by means of two rotary bearings having an axial distance from one another, in particular with reciprocating or piston engines or axial piston engines, the following requirements arise, among others:

Due to the tolerances, which can scarcely be avoided, it is necessary for at least one of the two swivel bearings to have the possibility of compensating for the deficient alignment between the swivel bearings. On the other hand, it is also a requirement for at least one of the swivel slide bearings to be suitable for providing reliable and long-term bearing support for the drive shaft even with the deflection and flexural movements which occur under full load.

With known piston engines or axial piston engines, conventional rolling bearings are used which are capable of accommodating radial forces and, if required, also axial forces. It is true that these bearings are still functional even in the event of deficient alignment of the bearings or deflection of the shaft, but the risk of overloading pertains, which in turn leads to increased wear, increased heating, and reduction of the service life.

A swivel slide bearing of the type referred to in the preamble is described and represented in DE 43 36 915 A1 without indication of any specific area of application. With this generic design, the fitting and removal of the swivel slide bearing is problematic. Accordingly, in that case the housing-side bearing body is designed in several parts, although this renders installation more difficult.

The object of the invention is to provide a swivel slide bearing of the type referred to in the preamble which can be fitted and removed in a simple manner.

This object is achieved by the features of claim 1. Advantageous further embodiments of the invention are described in the Sub-Claims.

With the embodiment according to the invention, the third bearing part has on one side at least one entry guide slot, in which the second bearing part can be introduced in an angle-rotated position as far as into a position in which the curvature mid-points of the bearing surfaces essentially cover one another. In this position, the second bearing part can be rotated into its function position, in which its mid-axis is essentially in alignment with the mid-axis of the third bearing part.

The invention is based on the finding that, when the curvature mid-points lie in one and the same point, the bearing parts can rotate relative to one another about the curvature mid-point, because the spherical segment-shaped bearing surfaces are located in a suitable position in relation to one another to allow for rotation into an approximately co-axial position during mounting, and rotating back into a transverse position corresponding to the entry guide slot. In this situation the invention is further based on the finding that, when the axial width of the first bearing part is smaller than the peripheral diameter of the spherical segment-shaped bearing surface of the outer bearing part and the width of the entry guide slot is likewise smaller than the peripheral diameter despite the presence of the entry guide slot, sufficiently large surface sections of the spherical segment-shaped bearing surface remain to allow, with the first bearing part in the mounted position, for the outer bearing part to engage in positive fit behind the inner bearing part on this side, and thereby for adequate axial as well as radial support to be guaranteed.

If it is intended that the spherical segment-shaped bearing surfaces should exclusively form support surfaces, and the bearing surfaces between the first and the second bearing part should fulfil the slide function, it is advantageous for the second bearing part and the third bearing part to be secured against rotation in respect of one another. Securing against rotation can be provided by means of a pin passed through the dividing surfaces between the bearing surfaces in the form of a spherical segment, which is preferably located in a radial hole of the second bearing part and is secured in this, e.g. by means of a press fit. The pin can, however, also be secured in a hole in the third bearing part. In the other bearing part in each case, preferably, a longitudinal hole is provided for the pin, extending in the axial plane of this bearing part, so that in the axial mid-plane limited relative pivotal movements can be carried out between the second and third bearing part, in order, during fitting, for the pin to be introduced into the longitudinal hole or to be guided out of it during disassembly.

In addition to this, the inner bearing surface in the shape of a spherical segment on the third bearing part and the outer ring-shaped bearing surface on the first bearing part can in each case be designed to form one function unit, for example on a shaft or a housing, of the engine concerned, or in an additional bearing sleeve, which can have special bearing function features in a simple and economical manner. For this purpose it can, for example, consist of a special material, which is well-suited for a bearing, or be replaceable as a part subject to wear, so that the service life of the other bearing parts can be extended by the replacement of the additional bearing sleeve in each case.

Features are contained in the additional Sub-Claims which allow for the design of the swivel slide bearing in relation to the drive shaft as a loose or fixed bearing, which lead to the improvement of the service life of the swivel slide bearing due to effectively functioning lubrication features, and also lead to a simple, small design, which can be manufactured economically.

Figure 5:
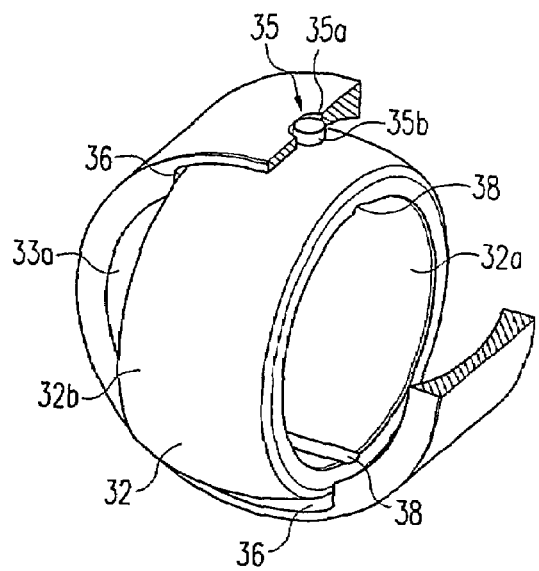
Figure 6:
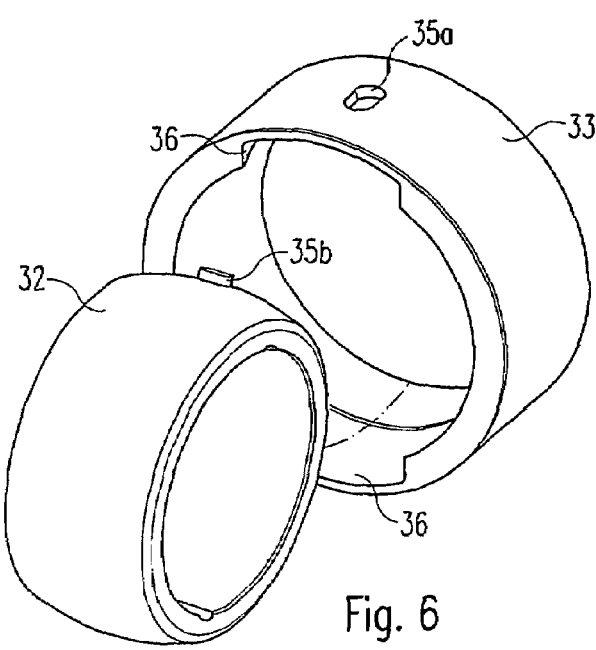
Figure 7:
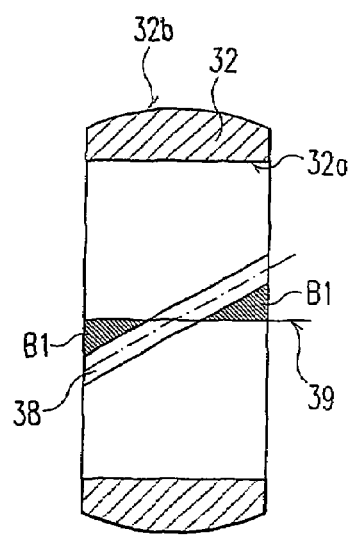
Figure 8:
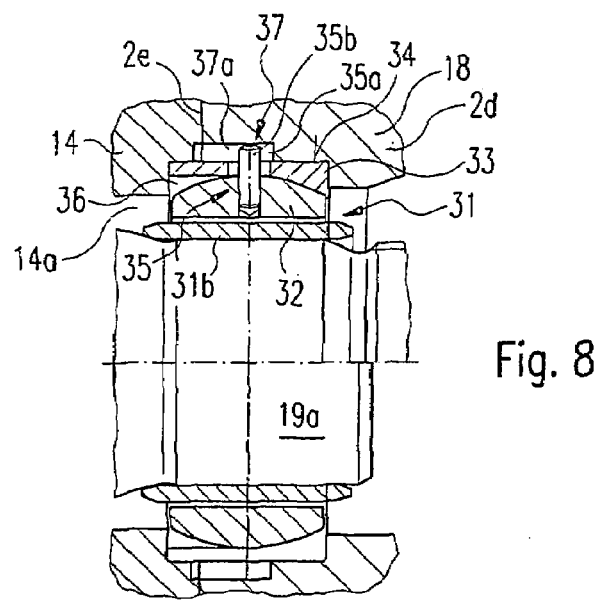
Figure 9:
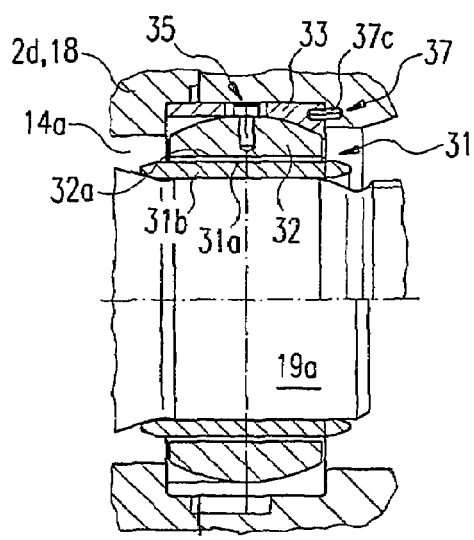
Figure 10:
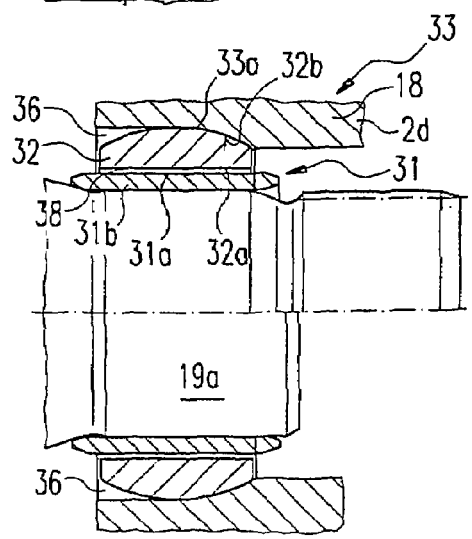
Figure 12:
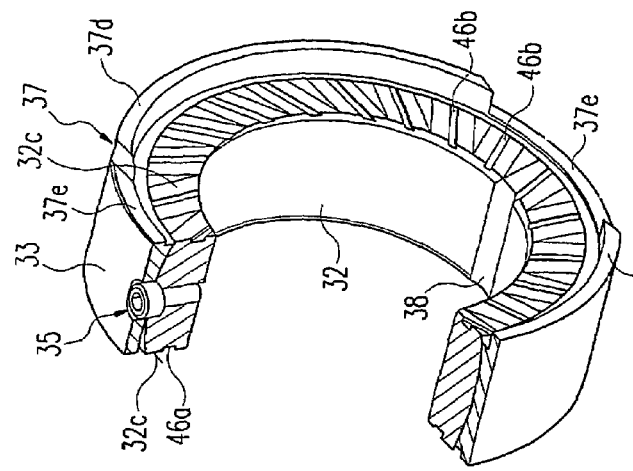
Figure 11:
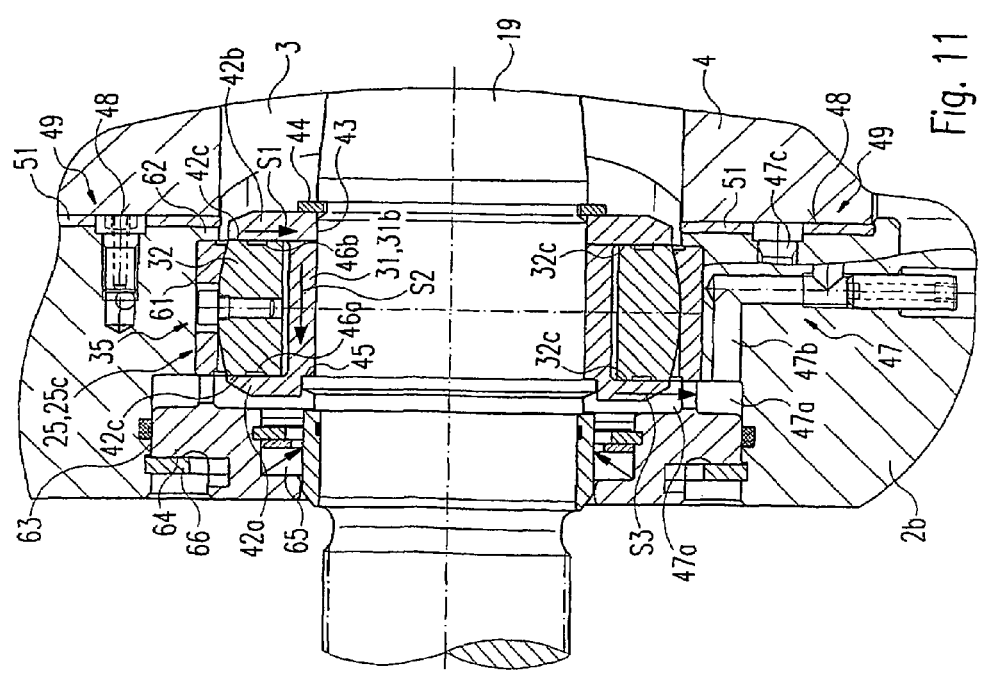

Advantageous embodiments of the swivel slide bearing according to the invention are described in greater detail hereinafter on the basis of the drawings. These show:

FIG. 1 An axial piston engine in an axial view;

FIG. 2 The detail characterised in FIG. 1 by II, with a swivel slide bearing according to the invention, in an enlarged sectional representation;

FIG. 3 The part section III-III in FIG. 2;

FIG. 4 A swivel slide bearing according to the invention, in a perspective representation as a modular part, partially in section;

FIG. 5 The swivel slide bearing according to FIG. 4, in another function position;

FIG. 6 The swivel slide bearing in a pre-mounting position;

FIG. 7 An outer bearing part of the swivel slide bearing in an axial section;

FIG. 8 The swivel slide bearing in a modified embodiment, in an axial section;

FIG. 9 The swivel slide bearing in a further modified embodiment, in an axial section;

FIG. 10 The swivel slide bearing in a further modified embodiment, in an axial section;

FIG. 11 A swivel guide bearing according to the invention in a modified embodiment, in an axial sectional representation;

FIG. 12 A second and a third bearing part of the swivel slide bearing in a perspective representation.

Figure 13:
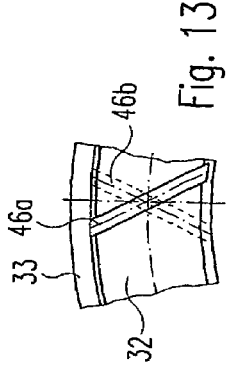

FIG. 13 A section of the swivel slide bearing in a front face view.

The piston engine represented in FIG. 1, arranged by way of example and designated in its totality as 1, has a housing 2, in the interior space 3 of which are arranged next to each other an oblique disk 4 and a cylindrical drum 5. Arranged in the cylindrical drum 5, distributed around the circumference, are piston holes 6, which in the present embodiment of an axial piston engine extend essentially parallel to a mid-axis 7 of the cylindrical drum 5 and are open on the face side 5a of the cylindrical drum 5 which is turned towards the oblique disk 4. Guide bushings 8 are securely located in the bushing holes 6, preferably pressed into place.

Mounted in an essentially axial displaceable manner in the guide bushings 8 are pistons 9, preferably cylindrical, which with their piston heads delimit working chambers 11 in the cylindrical drum 5 in the direction towards the oblique disk 4. The foot ends of the pistons 9, turned towards the oblique disk 4, are supported in each case by a joint 12 at the oblique disk 4, whereby slide shoes 13 may be present, between which and the foot ends the joints 12 are arranged, preferably designed as ball joints with a ball head and a ball recess.

The cylindrical drum 5 is located with its face side 5b turned away from the oblique disk 4 in contact with a control disk 14, in which at least two control apertures 15 are arranged in the form of kidney-shaped through holes, which form sections of a feed line 16 and a departure line 17, only indicated, which extend through an adjacent housing wall 18, to which the control disk 14 is held. The cylindrical drum 5 is arranged on a drive shaft 19, which is rotatbly mounted in the housing 2 and of which the axis of rotation 21 runs co-axially to the mid-axis 7 of the cylindrical drum 5.

With the present embodiment, the housing 2 is formed from a pot-shaped housing part 2a and a cover or connection part 2d forming the housing wall 18, which is in contact at the free edge of the circumferential wall 2c, and is screwed to this by means of screws 22, represented by indication only. In order to provide a connection with the feed and departure lines 16, 17, line connections 16a, 17a are provided at the connection part 2d. The drive shaft 19, which passes through the cylindrical drum 5 in a bearing hole, is rotatably mounted and sealed in bearing cut-outs of the housing base 2b and of the cover 2d by means of suitable bearings 25, 25a, whereby it passes axially through the housing base 2b and stands clear of the housing base 2b by means of a drive journal 19a.

With the embodiment of the piston engine 1 as an oblique disk engine, the cylindrical drum 5 is arranged in a torsionally-resistant manner on the drive shaft 19 by means of a rotary drive connection 26, such as a toothed coupling 28,29, whereby the shaft passes through the oblique disk 4, arranged fixed to the housing base 2 or formed in it, in a through hole 27. In the present embodiment, the cylinder drum 5 rotates in functional operation relatives to the oblique disk 4, whereby the pistons 9 are displaced longitudinally in the direction of the working chambers 11 and back again.

In the embodiment, the rear bearing 25a, mounted in the housing wall 18 or in the connection part 2d, is a swivel slide bearing 25b, which is combined with a spherically movable swivel slide bearing 25c, so that it is in a position to mount the drive shaft 19 in a rotatable manner and, in addition, to compensate for deficiencies in the alignment of the bearings 25, 25a, and/or flexural movements of the drive shaft 19, which arise in functional operation. As a result of this, tilting movements in the swivel slide bearing 25b are avoided or reduced, which improves the slide function, reduces the friction and heat in the swivel slide bearing 25d, and increases the service life.

The spherically-movable swivel slide bearing 25c, combined in the manner previously described, has an inner first bearing part 31 with an outer first bearing surface 31a, with which it is rotatably mounted in an outer second bearing part 32 with an inner second bearing surface 32a, with sliding play. As a result of this, the outer second bearing part 32 surrounds the inner first bearing part 31, whereby the outer second bearing part 32 is formed at least at its outer circumference as a ring with a spherical area-shaped outer third bearing surface 32b, with which it is capable of limited spherical movement; that is to say, it can be tilted on all sides in relation to the axis of rotation 21, mounted in a third bearing part 33 with an inner fourth bearing surface 33a formed at least partially in a corresponding spherical segment shape.

In the embodiment shown, the second bearing part 32 and the third bearing part 33 are formed as rings, which, for example, may have an equal axial width b. In the embodiment, the first bearing part 31 is designed wider than the second and third bearing parts 32, 33, overlapping these, for example on both sides.

In addition to this, in the embodiment shown, the first bearing part 31 is formed by a bearing bushing 31b, preferably of hollow cylindrical cross-section, which is arranged in a torsionally-resistant manner on a bearing journal 19a of the drive shaft 19, located on the bearing journal 19a by means of a press fit, for example.

The third bearing part 33 is preferably likewise a bearing sleeve 33b, which is located in a torsionally-resistant manner in or on the component which supports it, in this case on the cover or connection part 2d. For this purpose a bearing hole 34 is provided therein for the round third bearing part 33, preferably with a shoulder surface 34a, formed by an inner step, which delimits the third bearing part 33 axially outwards. In the embodiment shown, the bearing hole 34 extends inwards over the dividing surface 2e between the connection part 2d and the control disk 14 into the latter, a shoulder surface 34b preferably also being arranged here, which delimits the outer bearing part 33 inwards, as a result of which it is positioned axially in positive fit. With this embodiment, the bearing bushing 33b forms a centering journal for centering the control disk 14.

The embodiments according to FIGS. 1 to 9 and 11 to 13 are arranged for a rotational movement between the first and the second bearing part 31, 32 and for a spherical movement or tilting movement between the second and third bearing part 32, 33. In order to prevent a rotational movement about the axis of rotation 21 between the second and the third bearing part 32, 33, a rotation blocking device 35 with a journal connection is provided with a positive fit between the second and the third bearing part 32, 33. The journal connection comprises a blocking journal 35b, held at a distance from one of these two bearing parts 32, 33, and engaging into a longitudinal hole 35a of the other bearing part 32, 33, the longitudinal hole 35a extending along the axis of rotation 21. In addition, the longitudinal hole 35a and the blocking journal 35b are located in the radial plane Er of the bearing part 32, 33 concerned, containing the curvature mid-point M. As a consequence, a rotational movement between the bearing parts 32, 33 is blocked, although a limited tilting movement on all sides is possible, which allows for the compensation measures previously described.

The blocking journal 35b can be formed by a circular pin 35c, which is located securely in a hole in one of the bearing parts 32, 33, e.g. is pressed into place, and engages with its projecting, e.g. thickened, head into the longitudinal hole 35a of the other bearing part 32, 33 with a degree of movement play. In the embodiment shown, the pin hole is arranged in the second bearing part 32 and the longitudinal hole 35*a* is arranged in the third bearing part 33.

The blocking journal 35*b* is preferably arranged in the longitudinal mid-plane E intersecting symmetrically the control openings 15, or in the longitudinal mid-plane E1 extending at a right angle thereto. The reason for this is that the sum of the piston forces exerts a resultant transverse force, taking effect in the longitudinal mid-plane E, on the drive shaft 19, which can incur a slight flexing of the drive shaft 19 in the form of torque, which is compensated for by a tilting movement in the longitudinal mid-plane E. This tilting movement can be carried out by the spherically-movable bearing 25*c* in all transverse directions with no problem, and in particular in cases in which the longitudinal hole 35*a* extends in the longitudinal mid-plane E, or also if it is located in the longitudinal mid-plane E1. In this position a tilting movement as described heretofore takes place about the mid-axis of the blocking journal 35*b* extending transversely.

The third bearing part 33 has on one side an axial entry guide slot 36, which is designed in respect of its transverse dimensions A, B, and in its cross-sectional form, to be larger than the axial cross-sectional size and form of the second bearing part 32, so that the latter can be introduced into the guide slot 36 in an angle-rotated position, e.g. in a position rotated about some 90°. The axial length of the guide slot 36 is of sufficient dimensions for the second bearing part 32 to be able to slide in it into an intermediate position in accordance with FIG. 5, in which the curvature mid-points of the third and fourth bearing surfaces 32*a*, 33*a* lie in the common curvature mid-point M and therefore overlap. In this position, the second bearing part 32 can be rotated into its end position, in which its longitudinal mid-axis is approximately flush with the longitudinal mid-axis of the third bearing part 33. In this end position, rotated back, the second bearing part 32 is positioned axially in positive fit in the third bearing part 33 through the rear section of the spherical segment-shaped fourth bearing surface 33*a*.

In the embodiment shown, two guide slots 36 are arranged diametrically opposite and mirror-symmetrically to one another, so that the second bearing part 32 can be introduced centrally into the third bearing part 33. The rounded base surfaces 36*a* of the guide slots 36, located opposite one another, preferably corresponding in cross-section to the cross-section D of the second bearing part 32, are preferably formed tangentially to the spherical segment-shaped fourth bearing surface 33*a*, so that they run out centrally in the third bearing part 33 and pass over into the spherical segment-shaped fourth bearing surface 33*a*. This has the particular advantage that the introduced second bearing part 32 forms stops for the inward thrust movement of the second bearing part 32, at the sections of the spherical segment-shaped fourth bearing surface 33*a* located axially opposite the entry guide slots 36, and specifically in the intermediate position in which the curvature mid-points cover one another and the second bearing part 32 is rotatable. This ensures a simple and handling-friendly mounting. The second bearing part 32 needs only to be moved as far as an insertion thrust stop and then rotated.

With the embodiment shown, the width B of the at least one entry guide slot 36 is about ½ to ⅓ of the diameter D of the second bearing part 32. With this dimension, sufficiently large sections of the spherical segment-shaped fourth bearing surface 33*a* are present next to the at least one guide slot 36 to guarantee the positive-fit rear engagement in this axial direction.

To secure the third bearing part 33 against rotation in the housing wall 18, a press-fit can be used between the circumference of the third bearing part 33 and the wall of the bearing hole 34. With the embodiment shown according to FIG. 8, in which the same or comparable parts are provided with the same reference numbers, a positive-fit effect rotation blocking device 37 in the form of a journal connection is provided in the housing wall 18 or in the connection part 2*d*, which passes through the third bearing part 33 and engages into a longitudinal hole 37*a* in the housing wall 18 which corresponds essentially to the longitudinal hole 35*a*. In this arrangement, not only the second bearing part 32 but also the third bearing part 33 is positioned in positive fit at the housing wall 18, secured against rotation in the circumferential direction.

The mounting of the second bearing part 32 and the introduction of the blocking journal 35*b* into the longitudinal hole 35*a* is effected in such a way that the second bearing part 32 is introduced in a position in which it is rotated with the blocking journal 35*b* in relation to the longitudinal hole 35*a* (FIG. 6) so far that the blocking journal 35*b* can be introduced into the guide slot 36. When the blocking journal 35*b* is located in the area of the longitudinal hole 35*a*, the second bearing part 32 is rotated back, the blocking journal 35*b* entering into the longitudinal hole 35*a*. This is possible with no problem due to the spherical segment form of the second bearing part 32.

In the embodiment according to FIG. 8 too, with the appropriate dimensions it is possible for the lengthened blocking journal 35*b* to be introduced into the longitudinal holes 35*a*, 37*a* in such a way that the second bearing part 33 [sic] is introduced in a torsionally-resistant manner and is then rotated back, as has already been described for the embodiment according to FIGS. 2 to 6. It is also possible, however, for the longitudinal hole 37*a* to run out to the side from which the third bearing part 33 can be pushed into the bearing hole 34. With this embodiment, the third bearing part 33, with the second bearing part 32 mounted in it, can be pushed into the bearing hole 34, whereby the blocking journal 35*b* can also be introduced into the longitudinal hole 37*a*. With the embodiment according to FIG. 8, this is possible from the inner side, because the longitudinal hole 37*a* runs out to the dividing surface 2*e* between the housing wall 18 and the control disk 14, and this spherically-movable swivel slide bearing 25*c* can be mounted before the fitting of the control disk to the housing wall 18 or before the fitting of the housing wall 18 to the control disk 14.

With the embodiment according to FIG. 9, in which the same or comparable parts are provided with the same reference numbers, another arrangement of the rotation blocking device 37 is provided, whereby the rotation blocking device 35 can be designed in accordance with FIG. 8. According to FIG. 9, the rotation blocking device 37 is likewise formed by a journal connection, although this is not transverse in relation to the axis of rotation 21 but axially parallel and formed by a blocking pin 37*c*, which is arranged in the area of the step surface and engages in holes located opposite one another in the housing wall 18 and in the third bearing part 33.

The embodiment according to FIG. 10, in which the same or comparable parts are likewise provided with the same reference numbers, makes it clear that it does not require a separate third bearing part 33 if the inner fourth bearing surface 33*a* and the at least one entry guide slot 36 are formed directly at the housing wall 18 or the connection part 2*d*. With this embodiment too, blocking devices can be provided in the sense of FIGS. 8 or 9, whereby the longitudinal hole 35a can be arranged in the housing wall 18 (not shown).

With the present piston engine or axial piston engine 1, hydraulic fluid, e.g. hydraulic oil, is located in the interior space 3, which in function operation can be used for the lubrication of the bearing surfaces 31a, 32a, and preferably also of the bearing surfaces 32b, 33a. Particularly well-suited as lubricating fluid is a lubricating fluid containing water, which contains about 50% water and about 50% glycol, and is known in the specialist sector under the designation HFC.

In order to ensure the accessibility of the lubricating fluid located in the interior space 3, and in particular to the swivel slide bearing 25b, it is advantageous for an axial passage 14a to be provided between the control disk 14 and the drive shaft 19, which guarantees access for the lubricant fluid at least to the swivel slide bearing 25b. In the embodiment shown, the control disk 14 has a passage hole which surrounds the drive shaft 19 with an annular space interval. The diameter D1 of the through hole is preferably greater than the external diameter of the first bearing part 31 or of the bearing bushing 31b, with the result that an annular access to the bearing surfaces 31a, 33a, and preferably also to the bearing surfaces 32b, 33a, is guaranteed.

To further improve the lubrication system, it is advantageous to make provision in at least one of the bearing surfaces 33a, 32a, in this case in the inner second bearing surface 32a, for one or more lubrication grooves 38 distributed around the circumference, which can extend axially or obliquely or helicoidally, as shown in FIGS. 2 to 7. With an oblique or helicoidal arrangement of the at least one lubrication groove 38, a carrying area B1 is located on each axial side of the second bearing part 32, which is delimited by the edge of the lubrication groove 38 belonging to it and by a bearing surface line 39 extending axially.

With the previously described embodiments, the swivel slide bearing 25c is what is referred to as a loose bearing in relation to the drive shaft 19, i.e. there is no mutual axial support between the drive shaft 19 and the first bearing part 31 arranged secured on this and the second bearing part 32. By contrast, this axial support is provided between the third bearing part 33 and the housing 2 or, respectively, the housing wall 18 accommodating the swivel slide bearing 25b. There are also situations, however, in which axial support is desirable between the first and the second bearing parts 31, 32 in at least one axial direction. This can be achieved in that the second bearing part 32 is delimited on one or both sides in each case by a shoulder or bearing surface, which is arranged at the drive shaft 19 or at a fitted part thereof. A swivel slide bearing of this kind, designed in at least one axial direction as a fixed bearing, can be formed with two bearing parts 31, 32 as a swivel slide bearing 25b, or with the second and third bearing parts 32, 33 as a tiltable swivel slide bearing 25c, and therefore can absorb axial forces in one or in both axial directions.

With the embodiment according to FIG. 11, in which the same or comparable parts are provided with the same reference numbers, the swivel slide bearing 25c is arranged as a fixed bearing in the area of the housing 2, in this case in the housing base 2b, and taking effect in both axial directions, whereby it can form the bearing 25a arranged in the connection part 2d or, preferably, the bearing 25 arranged in the housing base 2b, as FIG. 11 shows. The second bearing part 32 is delimited on both face sides by a support flange 42a, 42b with movement play, which is fixed axially at the drive shaft 19 or at the first bearing part 31.

With the embodiment shown, a support flange, in this case the outer support flange 42a, is connected as a single piece to the first bearing part 31, these parts forming an angular ring body, and the inner support flange 42b having a coaxial hole 43, the peripheral hole with which it is located on the drive shaft 19, having slight movement play. On the side turned away from the swivel slide bearing 25c, the support flange 42b can be supported axially by a drive shaft shoulder 44, which is formed in the embodiment shown by a spring-loaded ring, located in an annular groove in the drive shaft 19. The first bearing part 31 preferably extends as far as the surface, turned towards it, of the second support flange 42b, and in the other axial direction, in this case outwards, it is axially supported by a drive shaft shoulder 45, which, as a single-piece flange ring, can be located at a distance from the drive shaft 19.

For the purpose of lubrication, provision is made in each case for one or more lubrication grooves 46a, 46b in the shoulder surfaces or sliding surfaces 42c of the support flange 42a, 42b (not shown) or in the face surfaces 32c of the second bearing part 32, arranged distributed on the circumference and running from the inside outwards, which are in connection radially inwards with a lubricant supply line and in connection radially outwards with a lubricant departure line and are therefore part of a lubricant circuit 47, through which a lubricant, e.g., hydraulic oil, flows when the piston engine is in operation. No special lubricant pump is required in order to maintain the flow in the lubricant circuit 47. The lubricant, which is in the lubrication grooves 46a, 46b during operation creates the flow in the circuit 47 automatically, due to the centrifugal force, which takes effect on the lubricant. The lubricant circuit 47 may, for example, be connected to the interior space 3 of the housing 2 through lubrication groove 47c.

An additional conveying effect on the lubricant can be achieved if the lubrication grooves 46a, 46b are inclined at an angle, and in particular if the lubrication grooves 46a on the one side and the lubrication grooves 46b on the other side are inclined in opposite directions to one another. It is possible for the lubrication grooves 46a (not shown) located in the rotating bearing part, in this case in the support flanges 42a, 42b, to be inclined opposed to the direction of rotation of the rotating bearing part, or the lubrication grooves 46a, 46b, located in the non-rotating bearing part, in this case the second bearing part 31 [sic], to be inclined in the direction of rotation. The inclination can also be spiral shaped. With these embodiments a forced delivery effect is exerted on the lubricant by the contact between the bearing surfaces, in this case the support flanges 42a, 42b, and the lubricant columns located in the lubricant grooves 46a, 46b. With the embodiment shown, in which the lubrication grooves 46a, 46b are arranged in the non-rotating second bearing part 32, the forced delivery effect is produced by the contact created by the bearing surfaces 42c of the rotating first bearing part 31, formed by the support flanges 42a, 42b.

With the embodiment shown, lubrication grooves 46a, 46b, arranged on both sides of the second bearing part 32 and pertaining to one another, are connected to the at least one lubrication groove 38 which can be located in the outer casing surface of the first bearing part 31 or in the inner casing surface of the second bearing part 32, and in this situation can be extended axially, such as is shown, for example, in FIGS. 4 and 5, or can extend obliquely, as is shown, for example, in FIG. 7. With an oblique course of the lubrication groove 38, the forced delivery effect is also produced in the area of the lubrication groove 38. The delivery effect is created by the contact which the bearing surface adjacent to the lubricant in the at least one lubrication groove 38 exerts on the lubricant. In this situation, the lubrication grooves 46a, 46b connected to one another by the straight lubrication groove 38, or the lubrication grooves 46a, 46b connected to one another by an oblique lubrication groove 38, and also the oblique lubrication groove 38, are aligned in such a way that the delivery effect takes effect in sequentially-following directions and result in a continuous delivery effect in the lubrication groove sections 46b, 38, 46a. In operation, the lubricant then enters at the radially outer end of the lubrication groove or lubrication grooves on the one side, and emerges at the radially outer end of the lubrication groove or lubrication grooves on the other side. The axial course of the delivery effect or the delivery direction outwards or inwards is dependent on the direction of rotation of the drive shaft 19 or of the first bearing part 31.

In the embodiment shown, the lubricant circuit 47 is formed by the inside lubrication grooves 46b being open radially outwards to the interior space 3. The outside lubrication grooves 46a are likewise open radially outwards, and they can likewise be connected to the interior space 3 by means of a lubricant channel, not shown.

FIG. 11 shows an embodiment in which a swivel bearing lubrication arrangement for an inherently-known pivotable oblique disk 4 is additionally incorporated into the lubricant circuit 47. In this embodiment, the lubricant grooves 46a open radially outwards into a preferably ring-shaped gap, or a lubricant channel section 47a, from which a lubricant channel 47b leads further in the housing base 2b, extends, for example, in an angular manner to the slide bearing surface 48 of a swivel bearing 49 for the oblique disk 4 mounted in a pivotable manner in this embodiment, and in this situation passes through a bearing shell 51 of the swivel bearing 49. The swivel bearing 49, arranged on the other side of the piston engine 1 in relation to the axis of rotation 7 of the drive shaft 19, can be connected in a similar manner to the lubricant circuit 47, which for the sake of simplicity is not shown.

In the embodiment shown, the directions of flow of the circuit flow in the area of the swivel slide bearing 25c, going outwards from the openings of the lubrication channels 46b, are initially directed radially inwards, then axially outwards, and then radially outwards; see S1, S2, S3.

FIG. 13 shows the lubrication grooves 46a, 46b, inclined opposed to one another, on both sides of the second bearing part 32.

In the embodiment according to FIG. 12, an axially-effective element 37 for securing against rotation is formed in that one or more segments 37d of the ring-shaped body of the third bearing part 33, for example two segments located opposite one another, project axially, engage in positioning cut-outs, arranged directly or indirectly at the housing 2 or housing base 2b, into which they engage, or in one or more positioning journals, engage into the at least one cut-out 37e present between two segments, for the purpose of interacting in such a way as to provide torsional resistance by positive fit.

In the embodiment shown, the swivel slide bearing 25c is located with its third bearing part 33 in a bearing hole 61, which has on the inner side a stop shoulder element 62 for the third bearing part 33 and is extended outwards in stages, whereby in the larger hole stage 63 a closure ring 64 with a ring seal 65 for the drive shaft 19 is inserted and secured axially by means of a securing ring 66.

The invention claimed is:

1. A piston engine, with a housing, in which a drive shaft is mounted such as to rotate by means of a swivel slide bearing, which has an inner first bearing part with an outer first bearing surface and an outer second bearing part with an inner second bearing surface,
   whereby the inner first bearing part is arranged in a torsionally-resistant manner on the drive shaft and the outer bearing part is designed as one piece and surrounds the inner bearing part with slide play,
   whereby the outer bearing part is formed at its outer circumference as a ring with a spherical segment-shaped third bearing surface, with which it is mounted with limited spherical movement in a third bearing part with a spherical segment-shaped inner fourth bearing surface, which surrounds the third bearing surface, whereby on one side of the third bearing part at least one entry guide slot is arranged, into which the second bearing part can be introduced in an angle-rotated position as far as into a position into the third bearing, in which the curvature mid-points (M) of the third and fourth bearing surfaces essentially cover one another, and whereby a rotation blocking device is arranged between the second and third bearing parts.

2. The piston engine according to claim 1, wherein the second bearing part is supported axially on one or both sides in each case by a support flange, which is supported at the first bearing part or at a component mounting the first bearing part in the axial direction turned away from the second bearing part.

3. The piston engine according to claim 2, wherein in each case one or more lubrication grooves are provided for in the sliding surfaces of the second bearing part and/or of the at least one support flange.

4. The piston engine according to claim 3, wherein the at least one lubrication groove is arranged radially or inclined at an angle in relation to the circumferential direction.

5. The piston engine according to claim 4, wherein the lubrication grooves located between the second bearing part and the support flanges are inclined on one side in one circumferential direction, and on the other side in the other circumferential direction.

6. The piston engine according to claim 3, wherein the lubrication grooves are connected to one another and form a part of a flow circuit.

7. The piston engine according claim 3, wherein the lubrication grooves are arranged in the sliding surfaces of the second bearing part.

8. The piston engine according to claim 1, wherein two entry guide slots are arranged opposite one another.

9. The piston engine according to claim 8, wherein
   the base surfaces of the entry guide slots run out tangentially into the spherical segment-shaped fourth bearing surface.

10. The piston engine according to claim 1, wherein the width (B) of the entry guide slot some is about ⅓ to ½ the diameter (D) of the second bearing part, and the width (b) of the second bearing part, is smaller than the width (B) of the entry guide slot.

11. The piston engine according to claim 1, wherein the rotation blocking device is formed by a journal connection between the second and third bearing part and a blocking journal secured to a bearing part with axial movement play engages into a recess in the other bearing part which is formed by an axial longitudinal hole.

12. The piston engine according to claim 1, wherein the third bearing part is a bushing-shaped bearing part, which is located in a bearing hole of an additional bearing part of said piston engine.

13. The piston engine according to claim 12, wherein the additional bearing part is formed by a connection part of an axial piston engine.

14. The piston engine according to claim 13, wherein the bushing-shaped bearing part is delimited on the inside by a control disk, which is arranged on the inner side of the connection part.

15. The piston engine according to claim 14, wherein the control disk is arranged on the inner side of the connection part, whereby an axial passage for a lubricant fluid is provided in the control disk or between the control disk and a drive shaft carrying the first bearing part.

16. The piston engine according to claim 1, wherein one or more lubrication grooves are arranged in the bearing surface of the first or second bearing part, which are arranged axially or obliquely, and run out laterally at both ends.

17. A swivel slide bearing, with a housing, in which a drive shaft is mounted such as to rotate by means of a swivel slide bearing, which has an inner first bearing part with an outer first bearing surface and an outer second bearing part with an inner second bearing surface, whereby the inner first bearing is arranged in a torsionally-resistant manner on the drive shaft and the outer bearing part is designed as one piece and surrounds the inner bearing part with slide play, whereby the outer bearing part is formed at its outer circumference as a ring with a spherical segment-shaped third bearing surface, with which it is mounted with limited spherical movement in a third bearing part with a spherical segment-shaped inner fourth bearing surface, which surrounds the third bearing surface, whereby on one side of the third bearing part at least one entry guide slot is arranged, into which the second bearing part can be introduced angularly rotated such that the curvature mid-points (M) of the third and fourth bearing surfaces essentially cover one another, whereby a rotation blocking device is arranged between the second and third bearing parts, and whereby the second bearing part is supported axially on one or both sides in each case by a support flange, which is supported at the first bearing part or at a component mounting the first bearing part in the axial direction turned away from the second bearing part, and wherein the third bearing part is a bushing-shaped bearing part, which is located in a bearing hole of an additional bearing part of said piston engine.

18. The swivel slide bearing according to claim 17, wherein two entry guide slots are arranged opposite one another.

19. The swivel slide bearing according to claim 18, wherein the base surfaces of the entry guide slots run out tangentially into the spherical segment-shaped fourth bearing surface.

20. The swivel slide bearing according to claim 17, wherein the width (B) of the entry guide slot is about ⅓ to ½ of the diameter (D) the second bearing part, and the width (b) of the second bearing part is smaller than the width (B) of the entry guide slot.

21. The swivel slide bearing according to claim 17, wherein the rotation blocking device is formed by a journal connection between the second and third bearing part and a blocking journal secured to a bearing part with axial movement play engages into a recess in the other bearing part, which is formed by an axial longitudinal hole.

22. The swivel slide bearing according to claim 17, wherein the additional bearing part is formed by a connection part of an axial piston engine.

23. The swivel slide bearing according to claim 22, wherein the bushing-shaped bearing part is delimited on the inside by a control disk, which is arranged on the inner side of the connection part.

24. The swivel slide bearing according to claim 23, wherein the control disk is arranged on the inner side of the connection part, whereby an axial passage for a lubricant fluid is provided in the control disk or between the control disk and a drive shaft carrying the first bearing part.

25. The swivel slide bearing according to claim 17, wherein one or more lubrication grooves are arranged in the bearing surface of the first or second bearing part, which are arranged axially or obliquely, and run out laterally at both ends.

26. The swivel slide bearing according to claim 17, wherein in each case one or more lubrication grooves are provided for in the sliding surfaces of the second bearing part (32) and/or of the at least one support flange.

27. The swivel slide bearing according to claim 26, wherein the at least one lubrication groove is arranged radially or included at an angle in relation to the circumferential direction.

28. The swivel slide bearing according to claim 27, wherein the lubrication grooves located between the second bearing part and the support flanges are included on one side in one circumferential direction, and on the other side in the other circumferential direction.

29. The swivel slide bearing according to claim 26, wherein the lubrication grooves are connected to one another and form a part of a flow circuit.

30. The swivel slide bearing according to claim 26, wherein the lubrication grooves are arranged in the sliding surfaces of the second bearing part.

* * * * *